United States Patent
Mills et al.

(10) Patent No.: US 7,376,171 B2
(45) Date of Patent: *May 20, 2008

(54) MULTIUSER DETECTION AIDED MULTIPLE ACCESS DIFFERENTIAL M-ARY CODING APPLICATIONS

(75) Inventors: Diane G. Mills, Wilmington, MA (US); Geoffrey S. Edelson, Andover, MA (US); Dianne E. Egnor, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 774 days.

This patent is subject to a terminal disclaimer.

(21) Appl. No.: 10/827,462

(22) Filed: Apr. 19, 2004

(65) Prior Publication Data

US 2004/0213328 A1    Oct. 28, 2004

Related U.S. Application Data

(63) Continuation-in-part of application No. 10/482,598, filed on Apr. 22, 2005, now Pat. No. 6,999,498, and a continuation-in-part of application No. 10/422,340, filed on Apr. 24, 2003, now Pat. No. 6,954,482.

(60) Provisional application No. 60/465,026, filed on Apr. 24, 2003.

(51) Int. Cl.
*H04L 27/30* (2006.01)

(52) U.S. Cl. ............... 375/133; 375/136; 375/349; 455/303

(58) Field of Classification Search ............... 375/132, 375/133, 136, 144, 148, 262, 265, 267, 346, 375/349; 455/52.3, 65, 296, 303
See application file for complete search history.

(56) References Cited

U.S. PATENT DOCUMENTS

| | | | |
|---|---|---|---|
| 5,193,102 A | 3/1993 | Meidan et al. | |
| 5,483,550 A | 1/1996 | Hulbert | |
| 5,745,187 A | 4/1998 | Hulyalkar et al. | |
| 6,201,563 B1 | 3/2001 | Rhee | |
| 6,704,376 B2 | 3/2004 | Mills et al. | |
| 6,891,857 B1 * | 5/2005 | Nevo et al. | 370/480 |

OTHER PUBLICATIONS

PCT International Search Report dated Sep. 1, 2004 of International Application No. PCT/US04/12414 filed Apr. 22, 2004.

(Continued)

*Primary Examiner*—Dac V. Ha
(74) *Attorney, Agent, or Firm*—Vern Maine & Associates

(57) ABSTRACT

Techniques for multiple access differential M-ary coding applications that can be optionally aided by multiuser detection (MUD) are disclosed. An initial hopped feature decoding is performed to provide data estimates for each user represented in a received co-channel signal. Interference cancellation can then be performed using MUD, thereby providing an interference-cancelled signal. Data estimates remaining are then re-decoded. Iteration on the interference cancellation and re-decoding can be carried out to satisfy a particular rule of iteration, although iteration is not always necessary. The final decoded signal can then be provided to its destination.

23 Claims, 8 Drawing Sheets

OTHER PUBLICATIONS

Lee, Paul, et al., "Capacity Enhanced for Correlated Frequency Hopping System", ATIRP, 1997, pp. 1-6, U.S. Army Research Laboratory.

Lee, Paul K., et al., "Spectrum Efficient HF System for Mobile Long Haul Communications", ATIRP, pp. 1-5, U.S. Army Research Laboratoy.

Robertson, Patrick, et al., "A Comparison of Optimal and Sub-Optimal MAP Decoding Algorithms Operating in the Log Domain", IEEE, 1995, pp. 1009-1013.

Hagenauer, Joachim, et al. "A Viterbi Algorithm with Soft-Decision Outputs and its Applications", IEEE, 1989, pp. 1680-1686.

Pottie, Gregory J., et al. "A Comparison of Reduced Complexity Decoding Algorithms for Trellis Codes", IEEE Journal on Selected Areas of Communications, Dec. 1989, pp. 1369-1380, vol. 7, No. 9.

Aulin, Tor, et al. "Trellis Coded Multiple Access (TCMA)", IEEE, 1999, pp. 1177-1181.

PCT International Search Report dated Dec. 12, 2003 of International Application No. PCT/US03/24920 filed Aug. 7, 2003.

* cited by examiner

MULTIUSER DETECTION AIDED MULTIPLE ACCESS DIFFERENTIAL M-ARY CODING APPLICATIONS

RELATED APPLICATIONS

This application claims the benefit of U.S. Provisional Application No. 60/465,026, filed Apr. 24, 2003. This application is also a continuation-in-part of U.S. application Ser. No. 10/422,340, filed Apr. 24, 2003 now U.S. Pat. No. 6,954,482, and is a continuation-in-part of U.S. application Ser. No. 10/482,598, filed Apr. 22, 2005 now U.S. Pat. No. 6,999,498, which is a National Stage of International Application No. PCT/US03/24920, filed Aug. 7, 2003. Each of these applications is herein incorporated in its entirety by reference.

FIELD OF THE INVENTION

The invention relates to communications, and more particularly, to co-channel communications in multiple access differential M-ary coding applications.

BACKGROUND OF THE INVENTION

Spread spectrum is a communications technique where the baseband signal bandwidth is intentionally spread over a larger bandwidth by modulating the signal with a higher-frequency "spreading" code prior to transmission. As a result, energy used in transmitting the baseband signal is spread over a wider bandwidth, and appears noiselike. The ratio between the spread baseband and the original signal is called processing gain. Typical Spread spectrum processing gains vary between 10 dB and 60 dB. A complementary de-spreading operation is performed at the receiver. Example spread spectrum techniques include frequency hopping spread spectrum (FHSS) and direct sequence spread spectrum (DSSS), each of which provide a reliable communications method for users.

In the presence of many users, however, co-channel interference degrades the performance of existing spread spectrum techniques. Media access control (MAC) must be implemented to reduce co-channel interference and to coordinate access to the channel by all interested, cooperating parties. In addition, it is desirable in some applications that the transmitted waveform has a low probability of detection (LPD) by unintended receivers, and that the transmitted waveform is resilient in the presence of jamming signals (i.e., AJ).

None of the known existing spread-spectrum techniques provide a signal that has suitable LPD and AJ performance, while simultaneously allowing for conferencing without a MAC, and easy implementation. In addition, each known technique is associated with one or more disadvantages, such as wasteful use of bandwidth in DSSS, performance degradation in the presence of burst errors, and performance degradation in the presence of interference, both hostile and non-hostile.

What is needed, therefore, is an improved differential M-ary coding scheme having one or more hopped features, where the coding scheme can optionally be combined with an iterative or non-iterative form of multiuser detection (MUD).

BRIEF SUMMARY OF THE INVENTION

One embodiment of the present invention provides a method for receiving (in a multiuser communication environment) a co-channel signal including a target-user differential M-ary signal and one or more interfering other-user differential M-ary signals. The method includes decoding the co-channel signal based on a hopped feature associated with the co-channel signal, thereby providing soft-decision estimates of data bits included in the co-channel signal for each user. The method continues with removing estimated contributions of the interfering other-user differential M-ary signals using multiuser detection (MUD), thereby providing an interference-cancelled signal. The method proceeds with re-decoding ambiguous data estimates remaining in the interference-cancelled signal.

The hopped feature can be, for example, at least one of frequency (e.g., differential FHSS (DFHSS) system), time (e.g., differential pulse-position modulation system), phase (e.g., differential phase-shift keying system), amplitude (e.g., differential amplitude modulation system), code (e.g., differential code-division multiple access system—CDMA), duty cycle, polarity, dwell time, and basis function. Note that more than one feature can be incorporated into the encoding process, and one type of feature can be used more than once in the process. For instance, a waveform can hop in both frequency and pulse position, and a waveform can follow two trellises for frequency and transmit two tones at once. The method may further include repeating the removing and re-decoding one or more times. Alternatively, or in addition to, the method may further include providing the re-decoded data estimates as final decoded data. In one particular embodiment, decoding the co-channel signal includes detecting the hopped feature per a predetermined time interval of the co-channel signal, constructing a trellis model for each user using values of the detected hopped feature as nodes, and determining soft-decision estimates of data bits included in the co-channel signal for each user, using the corresponding trellis model.

Another embodiment of the present invention provides a method for receiving a differential M-ary signal having one or more hopped features in a multiuser communication system. The method includes receiving a co-channel signal including a target-user differential M-ary signal and one or more interfering other-user differential M-ary signals, detecting at least one hopped feature (e.g., frequency, time, phase, and dwell time) per a predetermined time interval of the co-channel signal, constructing a trellis model for each user using detected hopped feature values as nodes, and determining soft-decision estimates of data bits included in the co-channel signal for each user, using the corresponding trellis model. The method may further include providing the soft-decision estimates as final decoded data.

Alternatively, the method may further include removing estimated contributions of the interfering other-user differential M-ary signals using multiuser detection (MUD), thereby providing an interference-cancelled signal. Here, the method continues with re-decoding ambiguous data estimates remaining in the interference-cancelled signal. In response to determining iteration is likely to improve the quality of the re-decoded data estimates, the method may further include repeating the removing and re-decoding. In response to determining iteration is not likely to improve the quality of the re-decoded data estimates, however, the method may include providing the re-decoded data estimates as final decoded data. Alternatively, the method may simply include repeating the removing and re-decoding one or more times, and/or providing the re-decoded data estimates as final decoded data.

In one particular embodiment, determining the soft-decision estimates includes generating estimates of the data bits based on a cumulative soft-valued metric, and/or providing a confidence value for each estimate. In another particular embodiment, the method further includes inferring missing nodes of the trellis model from existing nodes based on one or more detected hopped feature values, and correcting for burst errors.

Another embodiment of the present invention provides a system (MUD-aided differential hopping receiver) for receiving in a multiuser communication environment a co-channel signal including a target-user differential M-ary signal and one or more interfering other-user differential M-ary signals. The system includes an initial decoding module and an interference cancellation and re-decoding module. The initial decoding module is adapted to detect at least one hopped feature (e.g., frequency, time, phase, amplitude, code (e.g., CDMA code), duty cycle, polarity, dwell time, and basis function) per a predetermined time interval of the co-channel signal, thereby enabling construction of a trellis model for each user using detected hop feature values as nodes, and is also adapted to determine soft-decision estimates of data bits included in the co-channel signal for each user, using the corresponding trellis model. The interference cancellation and re-decoding module is operatively coupled to the initial decoding module, and is adapted to remove estimated contributions of the interfering other-user differential M-ary signals using multiuser detection (MUD) thereby providing an interference-cancelled signal, and is also adapted to re-decode ambiguous data estimates remaining in the interference-cancelled signal.

In one such embodiment, the initial decoding module includes a hopped feature detector for detecting the at least one hopped feature per a predetermined time interval of the co-channel signal, and one or more soft decision trellis decoders for determining the soft-decision estimates of data bits. Each soft decision trellis decoder can be further adapted, for example, to generate estimates of the data bits based on a cumulative soft-valued metric, and/or to provide a confidence value for each estimate. Each soft decision trellis decoder can be further adapted to infer missing nodes of the trellis model from existing nodes based on values of the one or more detected hopped features, and to correct for burst errors.

In another such embodiment, the interference cancellation and re-decoding module includes one or more multiuser detectors for removing the estimated contributions of the interfering other-user differential M-ary signals for each user, and a corresponding soft decision trellis decoder operatively coupled to each multiuser detector, for re-decoding the ambiguous data estimates remaining in the interference-cancelled signal. In another such embodiment, the system further includes an iteration controller that is operatively coupled to the interference cancellation and re-decoding module, and is adapted to provide the re-decoded data estimates for further processing by the interference cancellation and re-decoding module when appropriate, based on an iteration rule. In response to determining that iteration is not likely to improve the quality of the re-decoded data estimates, the iteration controller can provide the re-decoded data estimates as final decoded data.

Embodiments of the present invention provide a number of advantages, including improved bit error rate (BER) performance for the same number of users, when compared to conventional techniques. Also, an increase in the number of allowable users is enabled without affecting the BER performance. Thus, multiuser detection techniques are combined to differential feature hopped systems, thereby increasing the number of simultaneous users that may operate in the same area without degradation of the decoded data.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
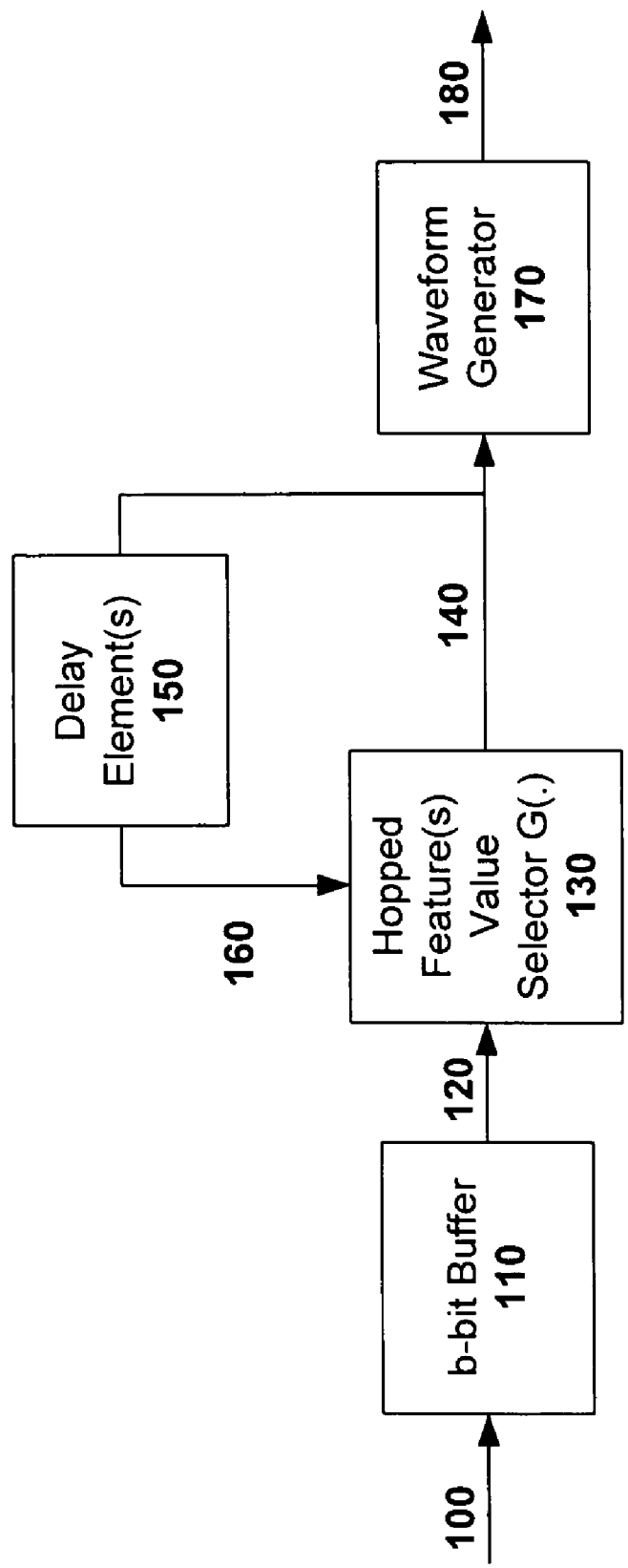
FIG. 1 illustrates a functional block diagram of a differential hopping transmitter configured to operate in accordance with an embodiment of the present invention.

Embodiments of the present invention provide differential M-ary feature hopping techniques, which can be combined with multiuser detection (MUD) techniques to implement a conferenced, multiple access operation of differential M-ary feature hopped waveforms. The described approach can be used with any differential M-ary coding scheme not fully utilizing its capabilities and having one or more trackable hopped features. For instance, the differential M-ary coding scheme can use: differential frequency hopped spread spectrum modulation, where the hopped feature is frequency; differential pulse-position modulation, where the hopped feature is time; differential phase-shift keying, where the hopped feature is phase; differential amplitude modulation, where the hopped feature is amplitude; differential CDMA, where the hopped feature is the code; or differential wavelet transmission, where the hopped feature is the basis function. Other trackable features associated with M-ary coding schemes, such as dwell time, duty cycle, and polarity, can also be used as hopped features.

Interfering M-ary signals are decoded, thus removing the feature detections that correspond to confidently decoded interfering symbols from the time-feature detection matrix, and the result is re-decoded. This process may continue iteratively until an iteration control determines that iterating is to stop (e.g., based on a predefined rule of iteration). The decoded symbols for the desired user are then output. The conferencing multiple access capabilities of the differential M-ary waveform are significantly improved by using iterative multiuser decoding techniques. However, the present invention is not intended to be limited to iterative MUD techniques. Rather, interfering signals can be removed using a single pass through the MUD component. Alternatively, no MUD processing is required.

Differential Hopping Transmitter

For differential M-ary waveforms, the values of the transmitted hopped features depend on both the current data symbol and the previous value of the transmitted hopped features. Thus, given a data symbol $X_n$ and values of the previous hopped features $F_{n-1}$, the values of the next hopped features are determined as: $F_n = G(F_{n-1}, X_n)$, where the function G can be viewed as a directed graph which has nodes corresponding to hopped feature values, and vertices labeled with input data patterns. For example, in a differential frequency hopped spread spectrum system, assume a data symbol $X_n$ and frequency of the previous hop $F_{n-1}$. Here, the frequency of the next hop is determined as: $F_n = G(F_{n-1}, X_n)$, where the function G can be viewed as a directed graph which has nodes corresponding to frequencies, and vertices labeled with input data patterns. Because the series of transmitted tones (or other hopped feature) form a trellis, the receiver is able to make soft decisions on the data bit estimates, which provides for improved performance. Also, the waveform becomes difficult for unintended receivers to decode.

It has been shown, for example, that a communication system using a differential frequency hopping (DFH)-based waveform and trellis-based receiver outperforms standard FH and direct sequence spread spectrum (DSSS) under a variety of conditions, independent of frequency band. For instance, the receiver can reconstruct hops that are missing due to a fading channel or from collisions with other users. The trellis also allows for conferencing of multiple users for receivers that follow multiple trellises. Attempts to jam the waveform by fast-follow-on jammers can actually increase the strength of the received signal and improve performance of a DFH-based system.

FIG. 1 illustrates a functional block diagram of a differential hopping transmitter configured in accordance with an embodiment of the present invention. The transmitter includes a b-bit buffer 110, a hopped feature value selector G(.) module 130, a number of delay elements 150, and a waveform generator module 170. The transmitted hopped features form a trellis defined by the function G, as previously explained.

The data bit stream from a data source is passed on input line 100 to the b-bit buffer 110, which collects b bits of the data stream. The value of b is the number of bits that are encoded within each feature hop (e.g., frequency or time hop). The b-bit symbol is passed on line 120 to the hopped feature value selector G(.) module 130, which uses both the current b bits of data and at least one previously transmitted hopped feature value (e.g., previous hop frequency or tone) from line 160 to determine the current hopped feature value selection (e.g., current hop frequency or tone). The current hopped feature value selection is provided on line 140 to the waveform generator module 170, which transmits using the selected hopped feature value on line 180. The hopped feature value selection on line 140 is also passed to a delay module 150, for use in subsequent hopped feature value selections.

Each of these components can be conventionally implemented in hardware, software, firmware, or some combination thereof. For example, each module can be implemented as a set of software instructions executing on a digital signal processor or other suitable processing environment.

Figure 2:
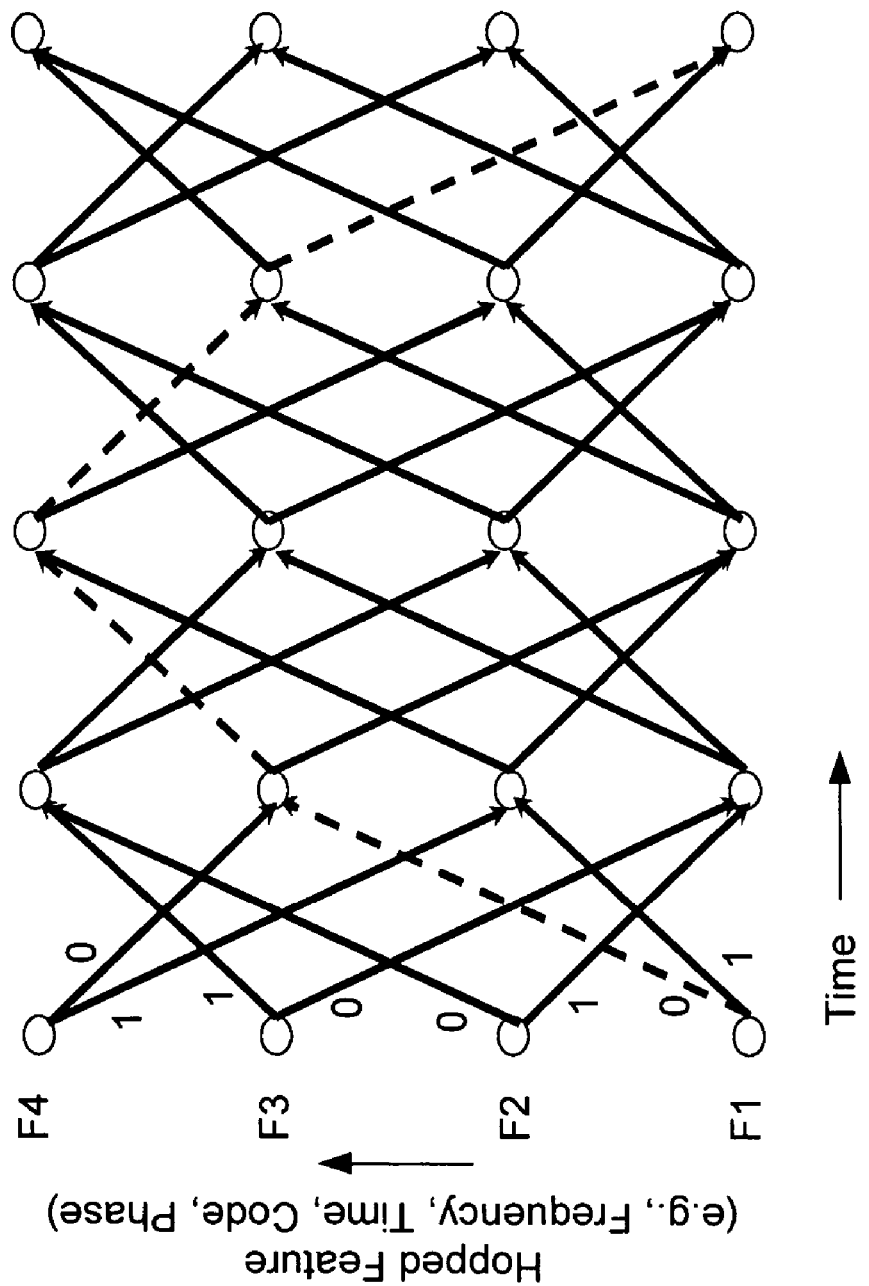
FIG. 2 is a graph illustrating an example trellis model for the transmitter illustrated in of FIG. 1.

Trellis models, often used in depicting and analyzing convolutional codes, can readily be applied to a differential feature-hopped signal, as shown in FIG. 2. Trellis models are the rule-based function used, for example, to describe the frequency (tone) selection process in a differential frequency hopped system. Other types of rule representation are also possible as will be apparent in light of this disclosure. As can be seen in FIG. 2, the vertical axis of the trellis corresponds to the hopped feature, while the horizontal axis corresponds to time intervals. The set of states at any given time corresponds to the set of all possible hopped feature values (e.g., frequencies) that may be transmitted by the differential feature-hopped system. Note that more than one feature can be incorporated into the encoding process, and one type of feature can be used more than once in the process. For instance, a waveform can hop in both frequency and pulse position, and a waveform can follow two trellises for frequency and transmit two tones at once.

For a hopset of size M, there are M possible states at each stage in the trellis. The branches leaving each state terminate at the hopped feature values (e.g., frequencies, phases, or dwell times) that are possible at the next hop given the current value or state of that hopped feature. A label on each branch indicates the encoded bits that corresponds to the transition from the current transmitted hopped feature value (e.g., current frequency, phase, or dwell time) to the next transmitted hopped feature value (e.g., next frequency, phase, or dwell time).

For the trellis in FIG. 2, b=1 bit/hop, hopset size M=4, and the data sequence shown by the dotted line is 0110. Note that the first detection at hopped feature value F3, corresponds to a 0 data bit and the second detection at F3 corresponds to a 1 data bit, which illustrates that the sequence of detections carries the information, and not the detections themselves, per se.

While FIG. 2 shows two axes, the number of axes for any given system is dependent on the number of identifying hopped features (e.g., phase, amplitude, dwell time, duty cycle) that the system designer chooses to track. It will be apparent in light of this disclosure that transmitting data and determining a hopped feature value based on the current data and previous values of that feature can be extended to apply to numerous properties or combinations of properties of the signal, including but not limited to, frequency, phase, time, amplitude, coding, dwell time, duty cycle, polarity, and basis function.

Differential Hopping Receiver—One Trellis

At the receiving node, the transmitted signal is received and passed to a hopped feature detector, where at least one feature value (e.g., frequency) per a predetermined time interval is determined. The detected feature value is passed to a soft decision decoder that constructs a trellis model using the detected feature values as nodes, estimates a data value according to the known trellis constraints of a transmitted signal, and outputs a data estimate.

Figure 3:
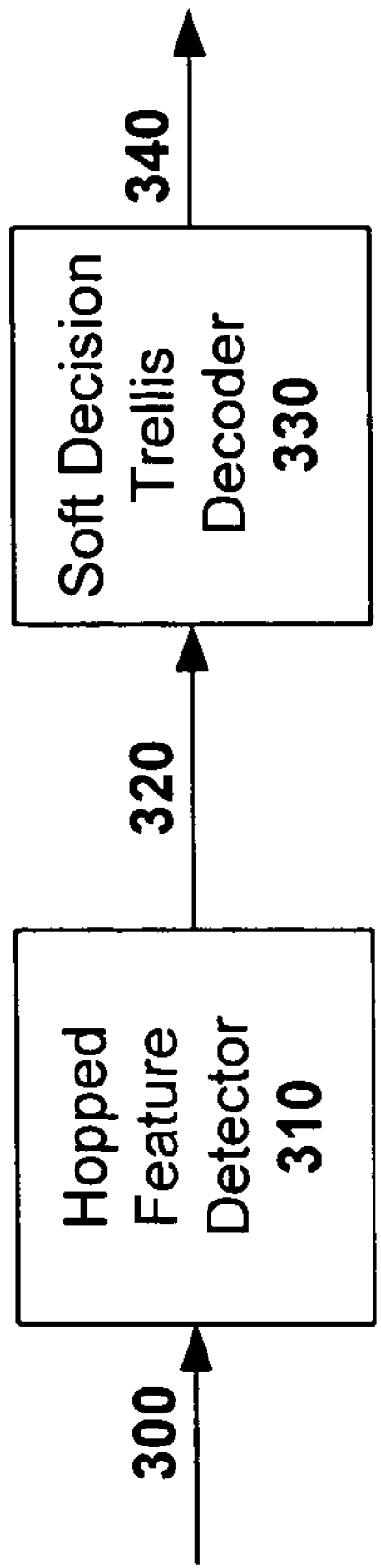
FIG. 3 is a block diagram illustrating a differential hopping receiver following one trellis, in a single user system in accordance with one embodiment of the present invention.

FIG. 3 shows a differential hopping receiver following one trellis (i.e., decoding one transmitted signal) in accordance with an embodiment of the present invention. The receiver includes a hopped feature detector module 310 and a soft decision trellis decoder module 330. As can be seen, the received signal is passed on line 300 to the feature detector module 310 (such as a spectrogram for a frequency hop detector) that determines which hopped feature value or values are present during each time interval. The set of detected values (e.g., frequencies) is provided at line 320 and passed to the trellis decoder module 330, which determines a soft-decision estimate of the transmitted data bits. This estimate is then provided at line 340.

The technique used in the trellis decoder 330 may be any trellis decoding technique, such as those employed by Viterbi or maximum a posteriori (MAP) decoders. The decoder 330 generates estimates of the data sequence based on a cumulative soft-valued metric. For instance, a soft-Viterbi decoder may be used which places the detected frequencies (assuming a DFH system) at each symbol interval on a trellis construction, and then the decoder 330 attempts to "connect" the detected frequencies according to known trellis constraints of the transmitted signal.

Burst errors are correctable because missing nodes on the trellis may be inferred from the existing nodes on the trellis (on both sides of the missing node or nodes), due to the trellis-encoded nature of the transmitted signal. Soft-decision decoding provides an estimate of the demodulated symbol as well as a confidence value for that estimate, and after some delay, the decoder 330 chooses the actual estimate. This process generally improves performance when compared to other modulation types and to hard-decision techniques.

Differential Hopping Receiver—Multiuser System

Figure 4:
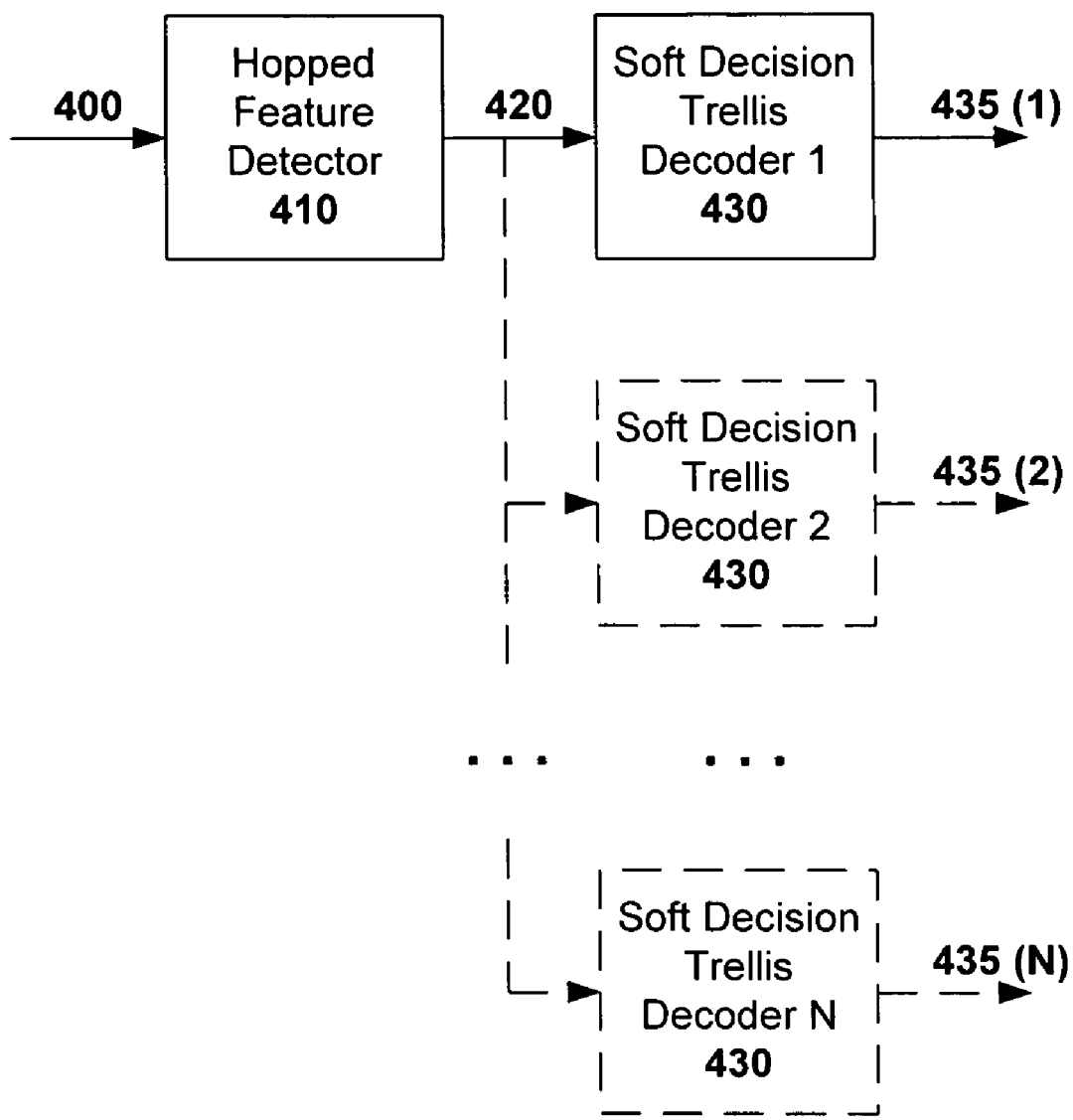
FIG. 4 is a block diagram illustrating a soft decision trellis decoding process in accordance with an embodiment of the present invention.

For a system in which the receiver is interested in demodulating signals from several users, the soft decision decoding is replicated for each desired signal. FIG. 4 is a block diagram illustrating a soft decision trellis decoding process replicated for each desired signal in accordance with an embodiment of the present invention. Here, a hopped feature detector module 410 is operatively coupled by line 420 to a number (N) of decoder modules 430.

Each decoder 430 represents the soft-decision trellis decoding process that is followed for each desired user (users 1 through N). Each decoder 430 is functionally identical, but decodes the received signal by using the trellis of the transmitting user of interest. In particular, a different trellis rule in accordance with the function G, as previously discussed. This trellis decoding process is further described in the context of soft-decision trellis-coded differential frequency-hopped spread spectrum (DFHSS) in related U.S. application Ser. No. 10/422,340, which was previously incorporated by reference in its entirety.

Figure 5:
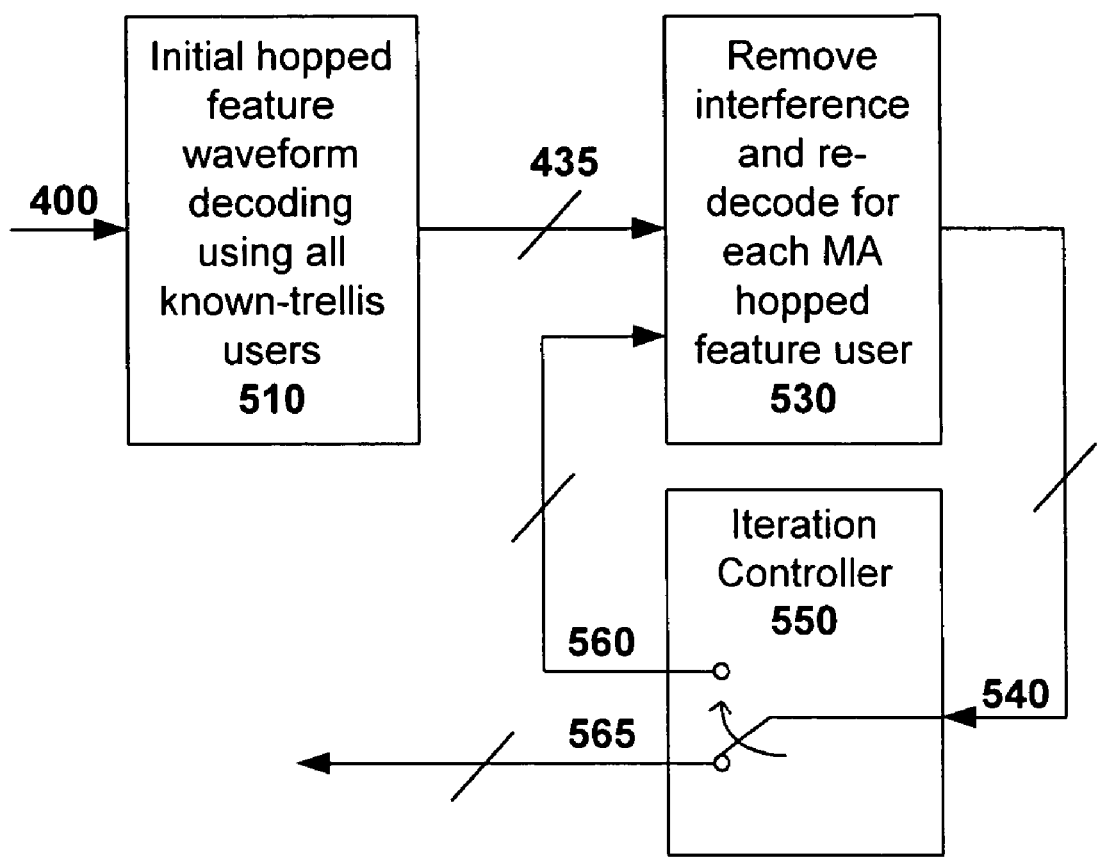
FIG. 5 is a functional block diagram of a MUD-aided differential hopping receiver configured in accordance with an embodiment of the present invention.

FIG. 5 is a functional block diagram of a MUD-aided differential hopping receiver configured in accordance with an embodiment of the present invention. The receiver includes an initial differential hopped feature waveform decoder module 510, an interference cancellation and multiaccess (MA) hopped feature re-decode module 530, and an iteration controller module 550. It will be appreciated in light of this disclosure that a general MUD-aided differential hopping multiaccess transmitter model operates as a differential hopping transmitter. It will further be appreciated that a MUD-aided differential feature hopping approach in accordance with the principles of the present invention is best demonstrated and understood at the receiver, as is shown in FIG. 5.

As can be seen in FIG. 5, the received signal is provided on line 400 to the initial differential hopped feature waveform decoder module 510, which detects all feature value (e.g., frequency) detections for each time interval and trellis-decodes the received hopped feature value detections for each trellis that is known or might be potentially used to generate differential feature hopped sequences. Thus, the initial decoder module 510 decodes the signal of interest as well as interfering differential feature hopped signals of all known-trellis users. Note that the process carried out by initial decoder module 510 can be implemented as shown in FIG. 4.

For optimal interference cancellation at the later stages, a separate hopped feature detector can operate on the received signal for each active user, but improved performance will be seen even if only a subset of interfering transmissions are removed. After the initial hopped feature detection is performed by decoder module 510, the successfully decoded symbols from interfering users are identified on line 435 and their contributions to the received matrix are removed in the interference cancellation section of module 530.

The multiaccess hopped feature re-decode section of module 530 then uses the modified received matrix to re-decode the ambiguous received values for the remaining detections in the time-hopped_feature_value matrix (e.g., time-frequency matrix). The updated decoded values are provided on line 540. If the iteration controller module 550 determines that iterating is not likely to improve the quality of the signal, the iterating process stops, and the symbols are output on line 565 as the final values. If the iteration controller module 550 determines that further iterations might be useful, the updated decoded values are passed on line 560 back to module 530, which again removes the hopped feature detections corresponding to successful decoded values for all of the interfering users, and re-decodes.

The iteration controller module 550 might, for example, count the number of iterations and stop after a pre-determined value, or it might compare previous decoded values to current decoded values and stop iterating if no significant changes were made, or it might examine confidence values associated with the soft decoding done in module 530. Other predefined rules of iteration can be employed by module 550 as well. Further note that the iteration controller 550 can also be configured to simply pass the decoded values through to the output at line 565 (if no iteration is desired). Similarly, the interference cancellation feature can be disabled (or just not employed), so that both unit 530 and the iteration controller 550 are each configured as feed-throughs. In any event, the decoded values can be effectively switched to a desired line (e.g., feedback output line and final value output line).

Figure 6A:
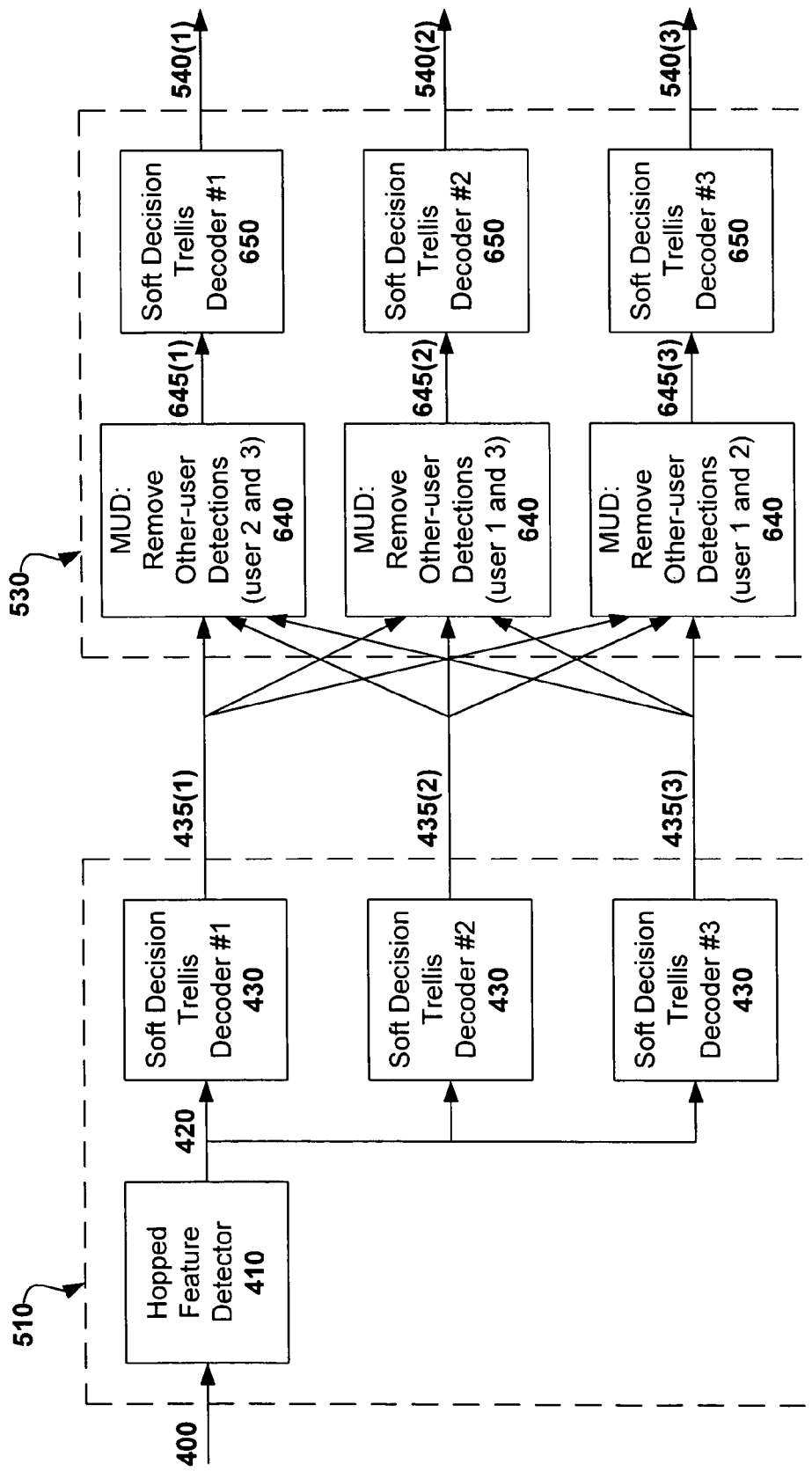
FIG. 6a is a detailed block diagram of a MUD-aided differential hopping receiver configured with no iteration in accordance with an embodiment of the present invention.

FIG. 6a is a detailed block diagram of a MUD-aided differential hopping receiver configured with no iteration in accordance with an embodiment of the present invention. As previously discussed, the receiver includes an initial hopped feature waveform decoder module 510 and an interference cancellation and multiaccess hopped feature re-decode module 530. There is no iteration controller module employed in this embodiment. Alternatively, although there may be an iteration controller, only a single iteration is carried out (e.g., where the iteration controller is configured as a feed-through from output 540 to output 565, thereby reducing processing time due to iteration). Note, however, that interference cancellation is optional and need not be performed for the present invention to operate.

In this particular example, the signal received at line 400 includes both a target signal (e.g., user 1) and two interfering signals (e.g., users 2 and 3). The received signal is provided to the hopped feature detector module 410 that determines which feature value or values (e.g., frequency or frequencies) are present during each time interval. In a DFH system, the hopped feature detector module 410 could be configured, for example, as a spectrogram or a fast Fourier transform (FFT) where a tonal pulse is the feature used. Other hopped feature detection techniques can be employed here as well, as will be apparent in light of this disclosure.

For instance, in a differential pulse-position modulation system (hopped feature is time), the hopped feature detector module 410 could be configured as a correlator, matched filter, or any other time synchronization method. In a differential phase-shift keying system (hopped feature is phase), the hopped feature detector module 410 could be configured as a phase detector. In a differential amplitude modulation system (hopped feature is amplitude), the hopped feature detector module 410 could be configured to read spectrogram values, or to perform envelop detection or A/D sampling. In a CDMA system (hopped feature is code), the hopped feature detector module 410 could be configured as a code detector or correlator or matched filter. In a differential wavelet transmission system (hopped feature is basis function), the hopped feature detector module 410 could be implemented using eigenvector decomposition. If the hopped feature is dwell time, then the hopped feature detector module 410 could be configured as an FFT or spectrogram (the time axis of a spectrogram can be used to determine dwell time) or a matched filter. If the hopped feature is duty cycle, then the hopped feature detector module 410 could be configured as a spectrogram (the time axis of a spectrogram can be used to determine duty cycle). If the hopped feature is polarity, then the hopped feature detector module 410 could be configured as a matched filter or to perform direct measurement from the corresponding antenna.

The set of detected hopped feature values (e.g., frequencies, phases, amplitudes, basis functions, or dwell times) is provided at line 420 to a bank of trellis decoder modules 430, where there is one trellis decoder for each received user. Each trellis decoder module 430 determines a soft-decision estimate of the corresponding transmitted data bit. Each estimate is then provided at the corresponding line 435. It will be appreciated that the soft decision trellis decoding for each user can be performed in parallel by distinct decoder modules as shown, or one at a time with a single decoder module. The previous discussions on trellis decoder embodiments and functionality in reference to FIGS. 4 and 5 equally apply here.

After the initial differential hopped feature detection is performed by module 510, the successfully decoded symbols from interfering users provided on line 435 are received at the interference cancellation and re-decoding module 530. Here, the decoded symbols from interfering users are received at respective interference cancellation (IC) modules 640. Each IC module 640 is adapted to remove the decoded symbols contributed to the received matrix by interfering users.

Conventional other-user interference cancellation techniques can be employed here (e.g., turboMUD or other known MUD algorithms). In one particular embodiment, the same-system interference cancellation techniques described in U.S. application Ser. No. 10/482,599, filed Dec. 23, 2003, and entitled "Cross-System Interference Cancellation for Multicarrier CDMA and OFDM" are employed by each module 640. This application is a national phase filing of earlier filed PCT Application No. PCT/US03/20484, filed Jun. 30, 2003, and is herein incorporated by reference in its entirety. In another embodiment, an iterative multiuser detection system that uses decoded error correction data within the iterations, as described in the U.S. patent application Ser. No. 10/105,918, filed Mar. 25, 2002, entitled "System for Decreasing Processing time in an Iterative Multi-User Detector System", is employed by each module 640. This application is herein incorporated in its entirety by reference. Alternatively, no MUD processing or interference cancellation is performed (e.g., where module 530 is configured as a feed-through or is otherwise disabled or not included). In such an embodiment, the decoded outputs 435 are provided to the corresponding outputs 540 with no further detection or processing.

Each interference cancellation module 640 provides an interference-cancelled matrix at a corresponding line 645. A corresponding soft decision trellis decoder module 650 then uses the modified matrix to re-decode the ambiguous received values for the remaining detections in the time-hopped_feature_value matrix (e.g., time-frequency matrix or the time-phase matrix or the time-CDMAcode matrix). The updated decoded values are provided on a respective line 540. As no iteration is employed here, these decoded values are final, and can be provided to their intended destinations (e.g., such as a local host or network or subsequent signal processing units).

Figure 6B:
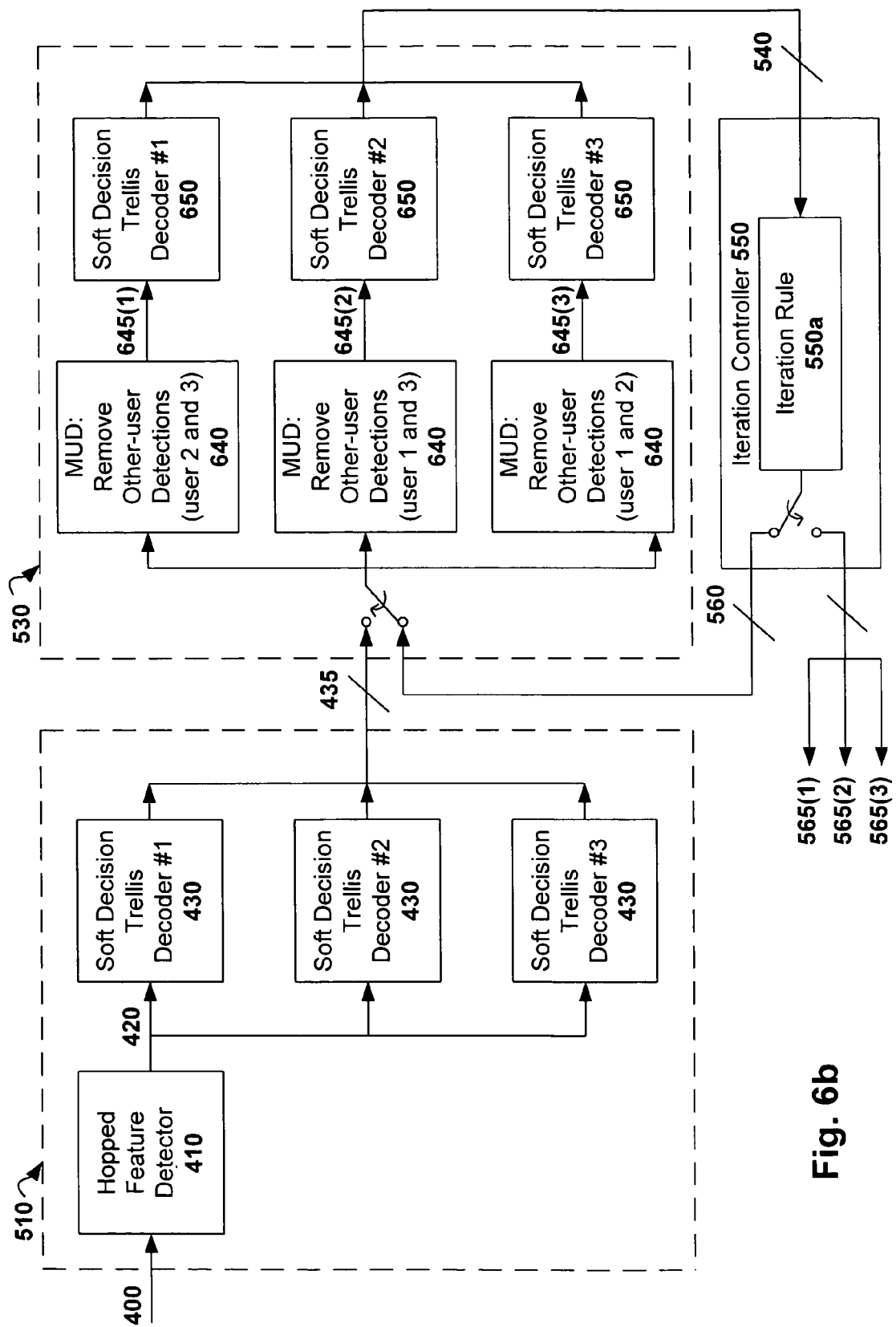
FIG. 6b is a detailed block diagram of a MUD-aided differential hopping receiver configured with iteration in accordance with an embodiment of the present invention.

FIG. 6b is a detailed block diagram of a MUD-aided differential hopping receiver configured with iteration in accordance with an embodiment of the present invention. The operation here is similar to that discussed in reference to FIG. 6a, except that the updated decoded values output on lines 540 are provided to the iteration controller module 550, which operates pursuant to an iteration rule 550a. The iteration controller module 550 decides according to the iteration rule 550a whether to pass the data estimates back for more MUD and re-decoding on lines 560, or to output the data estimates as final estimates on lines 565. The previous discussions relevant to the iteration controller and iteration rule equally apply here.

Note that the feedback path allows the input to the modules 640 to be effectively switched from lines 435 to lines 560 so that iterative processing and refinement of the data estimates can take place. During such iteration, note that the a "next" set of estimates provided on lines 435 by the initial decoder module 510 can be buffered or otherwise preserved until the iterative processing of the "current" estimates are finalized by the re-decode module 530. Recall, however, that MUD processing and interference cancellation is optional and need not be performed for the present invention to operate (e.g., where the decoded outputs 435 are provided to the corresponding outputs 540 with no further detection or processing).

Each of the components illustrated in FIGS. 6a and 6b can be conventionally implemented in hardware, software, firmware, or some combination thereof. For example, each module can be implemented as a set of software instructions executing on a digital signal processor or other suitable processing environment. Alternatively, each module can be implemented as a purpose built integrated circuit, such as one or more ASICs configured to provide the described functionality. Alternatively, the described functionality can be coded on a processor readable medium (e.g., such as a server, disk, or other computer program product) as one or more routines.

Figure 7:
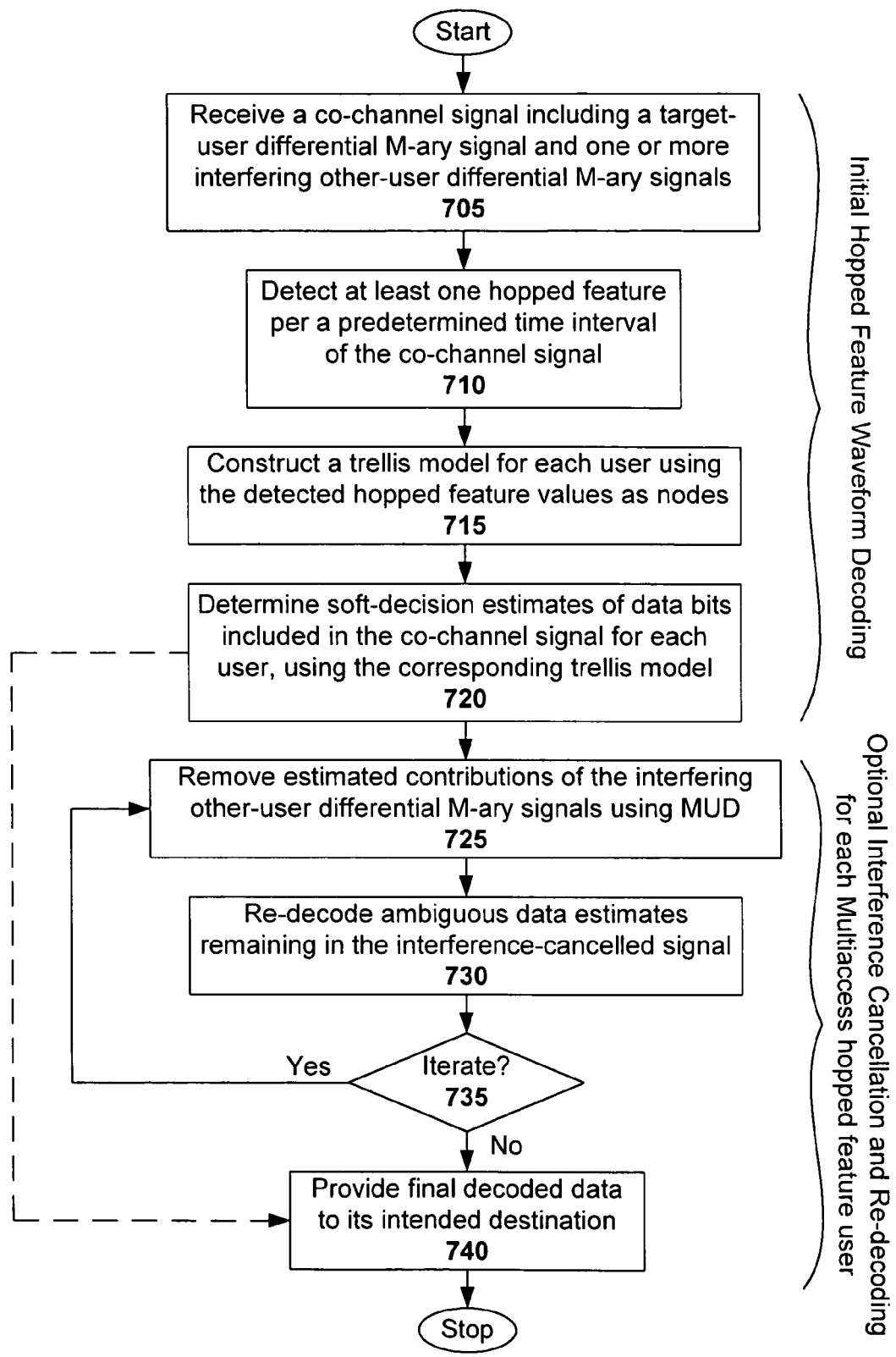
FIG. 7 is a flow chart illustrating a method for receiving a differential M-ary signal in a multiuser communication system in accordance with an embodiment of the present invention.

FIG. 7 is a flow chart illustrating a method for receiving a differential M-ary signal in a multiuser communication system in accordance with an embodiment of the present invention. This method can be carried out, for example, by the receiver discussed in reference to FIG. 5, 6a or 6b.

As can be seen, the method includes an initial hopped feature detection portion, as well as an optional interference cancellation and re-decoding portion. The initial hopped feature detection portion of the method begins with receiving 705 a co-channel signal including a target-user differential M-ary signal (e.g., DFH or CDMA signal) and one or more interfering other-user differential M-ary signals. The method proceeds with detecting 710 at least one hopped feature (e.g., frequency or time) per a predetermined time interval of the co-channel signal, and constructing 715 a trellis model for each user using the detected hopped feature as nodes. The initial hopped feature detection portion of the method continues with determining 720 soft-decision estimates of data bits included in the co-channel signal for each user, using the corresponding trellis model.

The optional interference cancellation and re-decoding portion then proceeds with removing 725 estimated contributions of the interfering other-user differential M-ary signals using MUD (e.g., conventional multiuser detection techniques may be employed here, such as turboMUD), and re-decoding 730 ambiguous data estimates remaining in the interference-cancelled signal. A determination 735 can then be made as to whether iteration is likely to improve the quality of the estimated signal. As previously explained, when iteration is employed, a rule of iteration can be used in the determination. If iteration is required, then the data estimates are subjected to the interference cancellation and re-decoding of steps 725 and 730. Otherwise, the iterating process stops, and the method continues with providing 740 the final decoded data to its intended destination. Note that the optional interference cancellation and re-decoding portion can be bypassed, such that the soft decision estimates determined in step 720 are provided as the final decoded data in step 740.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for receiving a differential M-ary signal having one or more hopped features in a multiuser communication system, the method comprising:
   receiving a co-channel signal including a target-user differential M-ary signal and one or more interfering other-user differential M-ary signals;
   detecting at least one hopped feature per a predetermined time interval of the co-channel signal;
   constructing a trellis model for each user using detected hopped feature values as nodes; and
   determining soft-decision estimates of data bits included in the co-channel signal for each user, using the corresponding trellis model.

2. The method of claim 1 wherein the hopped feature is at least one of frequency, time, phase, amplitude, code, duty cycle, polarity, dwell time, and basis function.

3. The method of claim 1 further comprising:
   removing estimated contributions of the interfering other-user differential M-ary signals using multiuser detection (MUD), thereby providing an interference-cancelled signal; and
   re-decoding ambiguous data estimates remaining in the interference-cancelled signal.

4. The method of claim 3 further comprising:
   in response to determining iteration is likely to improve the quality of the re-decoded data estimates, repeating the removing and re-decoding; and
   in response to determining iteration is not likely to improve the quality of the re-decoded data estimates, providing the re-decoded data estimates as final decoded data.

5. The method of claim 3 further comprising:
   repeating the removing and re-decoding one or more times.

6. The method of claim 3 further comprising:
   providing the re-decoded data estimates as final decoded data.

7. The method of claim 1 further comprising:
   providing the soft-decision estimates as final decoded data.

8. The method of claim 1 wherein determining the soft-decision estimates includes generating estimates of the data bits based on a cumulative soft-valued metric.

9. The method of claim 1 wherein determining the soft-decision estimates includes providing a confidence value for each estimate.

10. The method of claim 1 wherein further comprising:
    inferring missing nodes of the trellis model from existing nodes based on one or more detected hopped feature values; and
    correcting for burst errors.

11. A system for receiving in a multiuser communication environment a co-channel signal including a target-user differential M-ary signal and one or more interfering other-user differential M-ary signals, the system comprising:
    an initial decoding module adapted to detect at least one hopped feature per a predetermined time interval of the co-channel signal, thereby enabling construction of a trellis model for each user using detected hopped feature values as nodes, and to determine soft-decision estimates of data bits included in the co-channel signal for each user, using the corresponding trellis model; and
    an interference cancellation and re-decoding module operatively coupled to the initial decoding module, and adapted to remove estimated contributions of the interfering other-user differential M-ary signals using multiuser detection (MUD) thereby providing an interference-cancelled signal, and to re-decode ambiguous data estimates remaining in the interference-cancelled signal.

12. The system of claim 11 wherein the hopped feature is at least one of frequency, time, phase, amplitude, code, duty cycle, polarity, dwell time, and basis function.

13. The system of claim 11 wherein the initial decoding module includes:
    a hopped feature detector for detecting the at least one hopped feature per a predetermined time interval of the co-channel signal; and
    one or more soft decision trellis decoders for determining the soft-decision estimates of data bits.

14. The system of claim 13 wherein each soft decision trellis decoder is further adapted to generate estimates of the data bits based on a cumulative soft-valued metric.

15. The system of claim 13 wherein each soft decision trellis decoder is further adapted to provide a confidence value for each estimate.

16. The system of claim 13 wherein each soft decision trellis decoder is further adapted to infer missing nodes of trellis model from existing nodes based on values of the one or more detected hopped features, and to correct for burst errors.

17. The system of claim 11 wherein the interference cancellation and re-decoding module includes:
- one or more multiuser detectors for removing the estimated contributions of the interfering other-user differential M-ary signals for each user; and
- a corresponding soft decision trellis decoder operatively coupled to each multiuser detector, for re-decoding the ambiguous data estimates remaining in the interference-cancelled signal.

18. The system of claim 11 further comprising:
- an iteration controller operatively coupled to the interference cancellation and re-decoding module, and adapted to provide the re-decoded data estimates for further processing by the interference cancellation and re-decoding module when appropriate, based on an iteration rule;
- wherein in response to determining that iteration is not likely to improve the quality of the re-decoded data estimates, the iteration controller provides the re-decoded data estimates as final decoded data.

19. A method for receiving in a multiuser communication environment a co-channel signal including a target-user differential M-ary signal and one or more interfering other-user differential M-ary signals, the method comprising:
- decoding the co-channel signal based on a hopped feature associated with the co-channel signal, thereby providing soft-decision estimates of data bits included in the co-channel signal for each user;
- removing estimated contributions of the interfering other-user differential M-ary signals using multiuser detection (MUD), thereby providing an interference-cancelled signal; and
- re-decoding ambiguous data estimates remaining in the interference-cancelled signal.

20. The method of claim 19 wherein the hopped feature is at least one of frequency, time, phase, amplitude, code, duty cycle, polarity, dwell time, and basis function.

21. The method of claim 19 further comprising:
- repeating the removing and re-decoding one or more times.

22. The method of claim 19 further comprising:
- providing the re-decoded data estimates as final decoded data.

23. The method of claim 19 wherein decoding the co-channel signal includes:
- detecting the hopped feature per a predetermined time interval of the co-channel signal;
- constructing a trellis model for each user using values of the detected hopped feature as nodes; and
- determining soft-decision estimates of data bits included in the co-channel signal for each user, using the corresponding trellis model.

* * * * *